United States Patent [19]

MacGregor et al.

[11] 4,217,608

[45] Aug. 12, 1980

[54] RADIATION SCANNING SYSTEM

[75] Inventors: Stuart MacGregor; Peter J. Berry, both of Glasgow, Scotland

[73] Assignee: Barr & Stroud Limited, Glasgow, Scotland

[21] Appl. No.: 919,451

[22] Filed: Jun. 27, 1978

[30] Foreign Application Priority Data

Jun. 29, 1977 [GB] United Kingdom ............... 27129/77

[51] Int. Cl.² .............................................. H04N 7/18
[52] U.S. Cl. ................................... 358/113; 358/212; 358/213; 358/160; 358/166; 358/167
[58] Field of Search ............... 358/113, 212, 213, 160, 358/166, 167; 364/515

[56] References Cited

U.S. PATENT DOCUMENTS

| | | | |
|---|---|---|---|
| 3,997,774 | 12/1976 | Schlaepfer | 364/515 |
| 4,091,414 | 5/1978 | Chow | 358/166 |
| 4,121,248 | 10/1978 | Coale | 358/160 |

*Primary Examiner*—Howard W. Britton

*Attorney, Agent, or Firm*—Finnegan, Henderson, Farabow, Garrett & Dunner

[57] ABSTRACT

A d.c. coupled radiation scanning system having a plurality of radiation detector elements, a multiplexer and a scanned raster display device, including a circuit for compensating for variation in transfer characteristics of the detector elements. The compensating circuit monitors the voltage from each detector element, and derives and measures a voltage function therefrom in synchronism with the multiplexer. The voltage function may be average voltage or the average of the squares of voltages. Additionally, the mean value of all the measured voltage functions is determined over a succession of multiplexer time intervals, each measured value is compared against this mean value and the succession of error signals resulting therefrom is used to modify the signal output from the multiplexer and fed to the video input of the display device. The resultant display is thus compensated against spurious patterns, such as lininess or streaks, imposed as a result of differences in the transfer characteristics of the detector elements and the associated electronics.

5 Claims, 3 Drawing Figures

RADIATION SCANNING SYSTEM

This invention relates to radiation scanning systems wherein radiation from a field of view is scanned across an array of radiation-detector elements and the electrical signals output by these elements are utilised to control the video input of a scanned raster display device.

Such systems are broadly categorized into two types, viz. a.c. coupled and d.c. coupled. In the d.c. coupled category the drive signal to the display device is related to the absolute d.c. value of the detector output voltage whereas in the a.c. coupled category the display device drive signal is related to an arbitrary d.c. value. In d.c. coupled systems differences in the transfer characteristics of the detector elements and the associated electronics cause spurious patterns to be imposed upon the displayed image. One example of this is known as "lininess" in the display, but which is meant that adjacent parts of different raster lines have markedly different intensities where, from the image content, one would expect substantially identical intensities.

It is an object of the present invention to provide a form of radiation scanning system which is compensated for variation in transfer characteristics of the detector elements.

According to the present invention there is provided a radiation scanning system comprising a radiation detector having a plurality of detecting elements each of which forms the input of an electrical-signal-handling channel, multiplexing means connected to each said channel and providing an output terminal, a scanned raster display device having a video input driven by a signal derived from the signal appearing at said output terminal, and means for compensating for variation in transfer characteristics of said detector elements, wherein said compensating means comprises means operating synchronously with said multiplexing means for deriving a statistical-moment measurement of the voltage in each of said channels, means for comparing each said measurement with the mean value of all said measurements to derive error signals, and means for adjusting the signal applied to the video input of the display device as a function of said error signals.

The compensating means may be connected either in open loop or in closed loop.

Preferably, said means for deriving a statistical-moment measurement comprises a first circuit in which the average values of the voltages in each of said electrical-signal-handling channels are measured and compared against the mean value thereof and a second circuit in which the average values of the square of the voltages in each of said electrical-signal-handling channels are measured and compared against the average value thereof, the error signals from each of said circuits being used to adjust the signal applied to the video input of the display device.

The means for deriving statistical-moment measurements may also include other circuits in which third and higher powers of said voltages are computed, averaged and compared against the average value for all of the channels. It will therefore be appreciated that this form of circuitry effectively relates the statistical-moment measurement to a polynominal expansion for the transfer function of each channel. Alternative circuitry may be used to approximate channel transfer function to non-linear functions other than polynominal and to which the statistical moment measurement may be related. For example, an approximate truncated linear ramp may be used to estimate offset error on the basis of a limited section of the dynamic range of the channels.

Said compensating means may comprise a low impedance input, a high impedance output, a bank of capacitors one capacitor for each electrical-signal-handling channel and connected through a synchronous switch between said input and output, the arrangement being such that any one of the capacitors is connected between said input and output when the corresponding channel is producing video and said capacitor is open circuited otherwise a network consisting of two resistors connected in series between said input and output and to whose common junction is connected a further capacitor in series with a switch which connects said further capacitor to the signal reference level when video is present in any of said channels.

The system of the present invention may also include means for signalling errors in channel operation to an operator or to other equipment whereby to give automatic fault information.

Embodiments of the present invention will now be described by way of example with reference to the accompanying drawings, in which.

Figure 1:
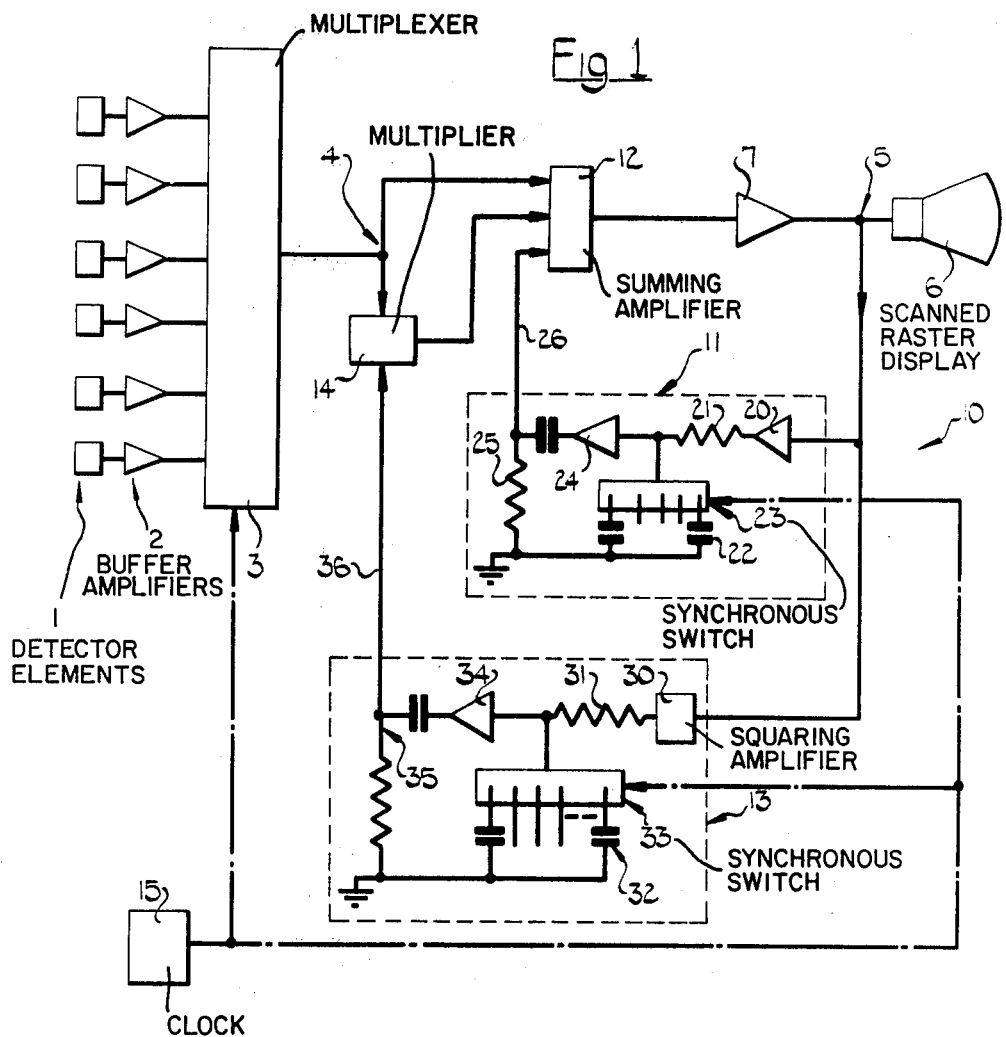
FIG. 1 illustrates a first embodiment.

The radiation detector illustrated in FIG. 1 comprises eight detector elements 1 which are arranged in an array of known format. The detector elements 1 are connected through buffer amplifier 2 to a multiplexing device 3 which provides an output terminal 4. The signal at terminal 4 is processed as will be explained and applied to the video input 5 of a scanned raster display device 6 by means of a common video amplifier 7. In accordance with the present invention the scanning system includes means 10 for compensating for variation in transfer characteristics of the detector elements 1. The means 10 comprises a first circuit 11 having its input connected to the video input 5 and arranged to feed an error signal to a summing amplifier 12 connected in advance of the video amplifier 7, and a second circuit 13 also having its input connected to the video input 5 and arranged to feed an error signal to a multiplying amplifier 14 connected in advance of the amplifier 12. Additionally amplifiers 12 and 14 are each connected to the terminal 4. A block 15 is connected to the multiplexing device 3, and to the circuits 11, 13 to ensure synchronism of operation.

The circuit 11 comprises a buffer amplifier 20 feeding into an RC network of which the resistance 21 is fixed and the capacitance 22 is one of a bank of capacitors connected to the resistance 21 by way of a synchronous switch 23. The time constant of the RC network, for each of the capacitors in the tank is relatively long, i.e. several times longer than the duration of a frame in the display device 6 and by virtue of this the charge in each of the capacitors 22 slowly builds up to represent the mean or average value of the voltage generated by respective detector elements 1. Thus, amplifier 24 which is coupled to resistance 21 transmits the mean or average value of the voltage generated by a particular detector element 1 and due to the operation of the switch 23, this gives rise to a waveform composed of a set of such mean values appearing consecutively at the output of amplifier 24. A further RC circuit 25 of long time constant connected at the output of amplifier 24 effectively removes the average of this waveform and applies an error signal via lead 26 to the summing amplifier 12. This error signal is a waveform which is composed of a set of errors in the mean waveform and caused by voltage offsets in the individual detector elements.

The circuit 13 is very similar in format to circuit 11 but instead of the buffer amplifier 20 circuit 13 has a squaring amplifier 30. At the output of amplifier 30 there is a resistor 31, a synchronous switch 33 and capacitors 32 forming a bank. Amplifier 34 which is connected to resistor 31 feeds a long time constant RC circuit 35 which in turn outputs a signal on lead 36 to the multiplying amplifier 14. The circuit 13 functions in a similar manner to circuit 11 but because of the presence of squaring amplifier 30 the error signal on lead 36 settles, in conjunction with circuit 11 to a waveform composed of a set of errors resulting from the gain differences of the individual detector elements with respect to the mean gain value.

Figure 2:
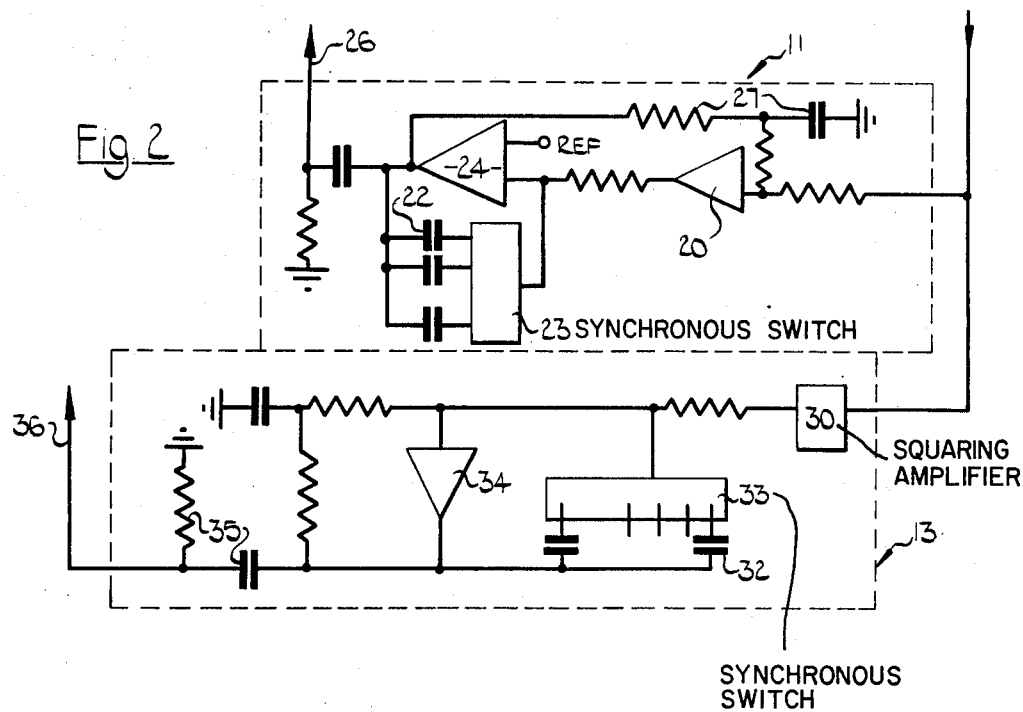
FIG. 2 illustrates modifications of details in the first embodiment.

The circuits 11, 13 may be varied in detail to achieve different results and for example may take the form illustrated in FIG. 2. In this case the amplifier 20 of circuit 11 includes a feedback loop containing a D.C. level control circuit 27 connected to the output of amplifier 24. Also, in this case, amplifier 24 is connected with the bank of capacitors 22 to operate as an integrator. If the gain of amplifier 20 is increased to permit that amplifier to function as a comparator and a non-zero reference applied to the integrator it becomes possible to optimise detector element performance with respect to a datum other than mean value. For example at a particular grey level. Thus, compensation for detector element variation can be tailored to a particular scene intensity region of interest. This can be achieved by using a step function to estimate percentile values at a step threshold voltage, these values then being used in a feedback loop to correct offsets. Another feedback loop may be used automatically to adjust the percentile value.

Figure 3:
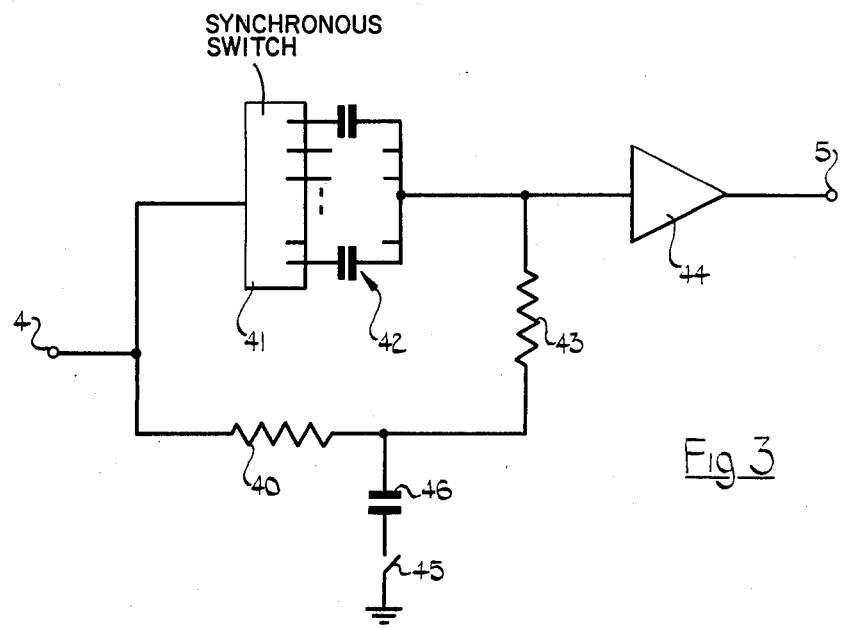
FIG. 3 illustrates a second embodiment.

In a second embodiment shown in FIG. 3 the signal appearing at terminal 4 of FIG. 1 is applied directly to an RC circuit formed by a resistor 40 and a capacitor 46 which is connected to ground through a synchronous switch 45 and indirectly to the appropriate one of a bank of capacitors 42 through a synchronous switch 41. The output of the RC circuit is connected to one end of a resistor 43 the other end of which is connected to the output of the capacitor bank and to the input of a buffer amplifier 44. The output of the buffer amplifier 44 is connected to terminal 5 of FIG. 1. The circuit of FIG. 3 functions similarly to circuit 11 of FIG. 1 in that it is corrective of errors in mean value of the voltage obtained from different detector elements. The RC circuit functions to charge its capacitor to a level representative of the mean of the voltages output by the various detector elements whereas the capacitors 42 respectively charge to the mean value of the voltages generated by respective detector elements, the difference between those two values being transmitted through the buffer amplifier 44 synchronously with operation of the multiplexing device. The switches 41, 45 are non-conducting during video blanking.

It will be appreciated that the embodiments of the present invention each operate on an analogue basis but it is within the ambit of the present invention to utilise a scanning system which operates, at least in part, on a digital basis. Thus, the compensating means of the present invention may be entirely digital in operation. This has the advantage that very long storage times can be realised without difficulty and compensation could be continued while suitable statistical information is not available.

The present invention provides a substantial enhancement to the operation of a visual display in a radiation scanning system provided that the scene under observation is such that over a substantial number of frames the output voltages for each detector element have a similar statistical distribution. This can be achieved in part by moving or defocussing the image but it can be made more accurately true by interchanging the roles of the various detector elements on each successive frame or scan so that every detector element scans every line of the picture the same number of times as any other. In the case where the compensation means of the present invention is in digital form and the scanner does not have detector element role interchange it is convenient to operate the scanning system in two modes, viz. with the compensation being updated when the quality of scene is such as to provide a statistical similarity at the different detector inputs; otherwise with the compensation maintained without alteration.

What is claimed is:

1. A radiation scanning system comprising a radiation detector having a plurality of detecting elements each of which forms the input of a d.c. coupled electrical-signal-handling channel, multiplexing means connected to each said channel and providing an output terminal, a scanned raster display device having a video input driven by a signal derived from the signal appearing at said output terminal, and means for compensating for variation in transfer characteristics of said detector elements, wherein said compensating means comprises means operating synchronously with said multiplexing means for monitoring the voltage in each of said channels, for deriving a voltage function from each monitored voltage, and for measuring each derived voltage function, means for determining the mean value of all said measured voltage functions over a succession of multiplexer time intervals, means operating synchronously with said multiplexing means for comparing each said measurement with said mean value to derive a succession of error signals, and means for synchronously adjusting the signal applied to the video input of the display device as a function of the pertaining error signal.

2. A radiation scanning system as claimed in claim 1, wherein said compensating means is connected in open loop between said multiplexing means and said scanned-raster display device.

3. A radiation scanning system as claimed in claim 1, wherein said compensating means is connected in closed loop between said multiplexing means and said scanned-raster display device.

4. A radiation scanning system as claimed in any preceding claim, wherein said means for monitoring, deriving, and measuring comprises a first circuit in which the average values of the voltages in each of said electrical-signal-handling channels are measured and compared against the mean value thereof and a second circuit in which the average values of the square of the voltages in each of said electrical-signal-handling channels are measured and compared against the average value thereof, the error signals from each of said circuits being used to adjust the signal applied to the video input of the display device.

5. A radiation scanning system as claimed in claim 1, wherein said compensating means comprises a low impedance input, a high impedance output, a bank of capacitors one capacitor for each electrical-signal-handling channel and connected through a synchronous switch between said input and output, the arrangement being such that any one of the capacitors is connected between said input and output when the corresponding channel is producing video and said capacitor is open circuited otherwise a network consisting of two resistors connected in series between said input and output and to whose common junction is connected a further capacitor in series with a switch which connects said further capacitor to the signal reference level when video is present in any of said channels.

* * * * *